B. N. REEVES.
COVER FOR CULINARY UTENSILS.
APPLICATION FILED MAR. 25, 1909.
946,271.
Patented Jan. 11, 1910.
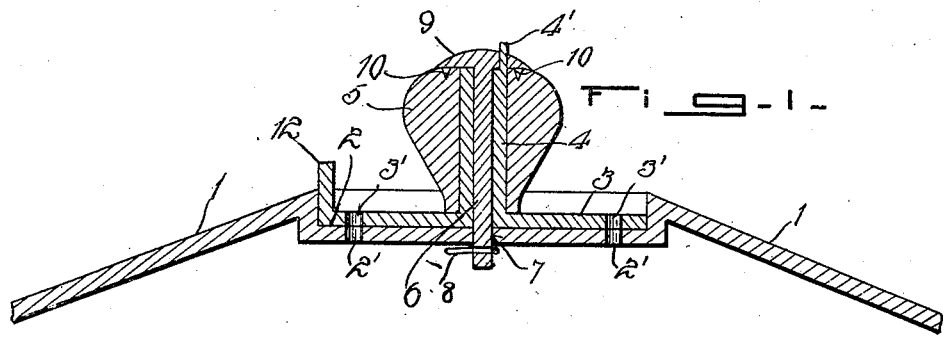
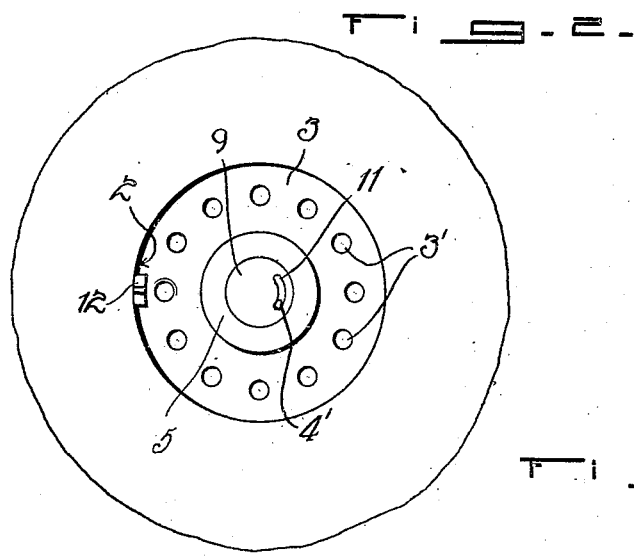
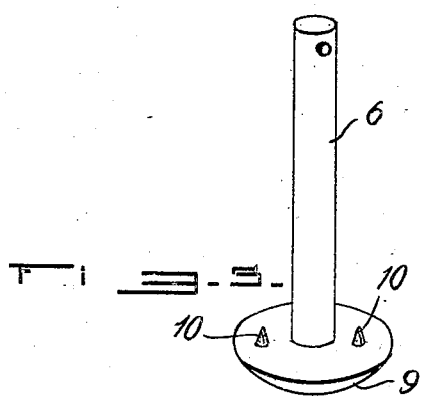
Witnesses
C. E. Chandler
E. L. Chandlee
Inventor
BELL N. REEVES.
By Woodward & Chandlee
Attorneys

UNITED STATES PATENT OFFICE.

BELL N. REEVES, OF EL PASO, TEXAS.

COVER FOR CULINARY UTENSILS.

946,271.  Specification of Letters Patent. Patented Jan. 11, 1910.

Application filed March 25, 1909. Serial No. 485,742.

*To all whom it may concern:*

Be it known that I, BELL N. REEVES, a citizen of the United States, residing at El Paso, in the county of El Paso and State of Texas, have invented certain new and useful Improvements in Covers for Culinary Vessels, of which the following is a specification.

In culinary vessels it is desirous that the steam generated therein should be allowed to escape at times thus keeping an even temperature within the vessel whereby better results may be obtained in preparing foods than would otherwise be the case, and my invention relates to covers for this class of vessels and has for its object to provide a cover that will confine the odors arising from the vessel and at the same time be so constructed that the steam may be allowed to escape at any time without removing the cover from the vessel.

Another object is to provide a cover which is extremely simple and inexpensive in construction and wherein the means for exhausting the accumulated steam is located in the knob, thus obviating the liability of burning the fingers.

With these and other objects in view the present invention consists in a combination and arrangement of parts, as will be hereinafter more fully described and particularly pointed out in the appended claims, it being understood that changes in the specific structure shown and described may be made within the scope of the claims without departing from the spirit of the invention.

In the drawings forming a part of this specification and in which like numerals of reference indicate similar parts in the several views, Figure 1 is a vertical section through my improved cover, Fig. 2 is a plan view thereof, Fig. 3 is a detailed perspective view of the means employed to secure the parts in position.

Referring to the drawings, 1 indicates my improved cover, which is of slightly cone shaped formation, though it will be clearly understood that my invention may be equally as well applied to the various forms of covers now in use. The central portion of the cover is recessed as shown at 2 to provide a seat for the vent plate 3. This plate is formed with a central vertical tubular portion 4 which extends entirely through the knob 5 and is provided at its upper end with the projection 4' the purpose of which will be later described. A securing pin 6 is adapted to be inserted in the tube 4 and is of such a length that it extends through the central perforation 7 of the cover 1 and is securely held in position by means of the cotter pin 8. The upper end of the pin 6 is flattened to form a circular head 9 the under surface of which is provided with spurs 10 which bite into the knob 5 and hold the same against rotative movement. This head is also provided with a short slot 11 which is concentric therewith and through which is adapted to extend the projection 4'. The vent plate 3 is provided with a series of perforations 3' and the reduced portion 2 of the cover is provided with a similar series of openings 2'.

From the above description taken in connection with the accompanying drawings the operation of the device will be obvious. When the interior of the vessel has attained too high a temperature by reason of the steam generated therein, it is only necessary to move the finger piece 4' in the slot 11 until the openings 2' and 3' are brought into registration, when the steam will escape through the vent openings thus provided and the interior temperature of the vessel will be correspondingly reduced. As the knob 5 is held stationary it may be firmly grasped and the extending finger piece operated by the index finger of the same hand. The shoulders formed by the recessed portion of the cover, will always retain the plate 3 in proper position for the openings therein to register with those in the cover in the event of wear of the parts, or any slight contraction or expansion thereof. At the outer edge of the vent plate 3, a lug 12 is integrally formed and projects above the edge of the recess 2, by means of which the vent plate may also be rotated. The lug 12 will not be grasped by the fingers however, but is adapted to be engaged by a knife blade or other convenient article and the plate 3 moved until the openings 2' and 3' register.

It will be noted that the plate may be rotated, and the openings provided therein be brought into register with those in the cover, without the necessity of placing the hand upon the knob, as the vent plate is very loosely mounted in the recess 13.

It will thus be seen that I have provided a cover that is very simple in construction, easy to operate, and which will perform its function in a highly efficient manner, and in

Having thus described my invention, what I claim as new and desire to obtain by United States Letters Patent is:

1. A cover for culinary vessels comprising the cover proper formed with a central recess and having openings therein, a vent plate in said recess, a knob centrally positioned above said vent plate, a tubular extension integrally formed with said vent plate and extending entirely through said knob, a pin extending through said extension and formed with a flat head at its upper end, said head being provided with means for preventing the rotary movement of the knob, means for securing said pin in position, and additional means for imparting rotary movement to said vent plate.

2. A cover for culinary vessels comprising the cover proper formed with a central recess and having openings therein, a vent plate provided with a tubular extension arranged in said recess, perforations in said vent plate, a knob surrounding said tubular extension, a pin extending through said extension and formed with a flat head at its upper end, said head having depending spurs adapted to bite into said knob to hold the same against rotary movement, means for securing said pin in position, and additional means for imparting rotary movement to said vent plate.

3. A cover for culinary vessels comprising the cover proper formed with a central recess and having openings therein, a vent plate provided with a tubular extension arranged in said recess, a finger piece formed on the upper end of said extension, perforations in said vent plate, a knob surrounding said tubular extension, a pin extending through said extension and formed with a flat head at its upper end, said head being provided with a slot to receive said finger piece and having depending spurs adapted to bite into said knob and hold the same against rotary movement, and means for securing said pin in position.

In testimony whereof I affix my signature, in presence of two witnesses.

BELL N. REEVES.

Witnesses:
A. W. REEVES,
P. W. STILL.